United States Patent
Lee et al.

(10) Patent No.: US 9,233,667 B2
(45) Date of Patent: Jan. 12, 2016

(54) APPARATUS OF SENSING MINOR COLLISION OF VEHICLE AND METHOD THEREOF

(71) Applicant: Hyundai Motor Company, Seoul (KR)

(72) Inventors: Hui Sung Lee, Gyeonggi-Do (KR); Sung Min Park, Seoul (KR); Kwang Myung Oh, Daejeon (KR); Sung Jin Sah, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 133 days.

(21) Appl. No.: 14/081,292

(22) Filed: Nov. 15, 2013

(65) Prior Publication Data

US 2014/0365095 A1    Dec. 11, 2014

(30) Foreign Application Priority Data

Jun. 10, 2013 (KR) .................. 10-2013-0065785

(51) Int. Cl.
    *B60T 7/22* (2006.01)

(52) U.S. Cl.
    CPC ............. *B60T 7/22* (2013.01); *B60T 2201/024* (2013.01)

(58) Field of Classification Search
    USPC ........................................ 180/274; 367/127
    See application file for complete search history.

(56) References Cited

U.S. PATENT DOCUMENTS

| 7,675,820 | B2 * | 3/2010 | Griffin et al. ................. 367/127 |
| 7,958,962 | B2 * | 6/2011 | Dukart et al. ................. 180/274 |

FOREIGN PATENT DOCUMENTS

| JP | 2003-156387 A | 5/2003 |
| JP | 4108212 B2 | 6/2008 |
| JP | 4108214 B2 | 6/2008 |
| KR | 10-0132968 B1 | 12/1997 |
| KR | 20-1996-064357 | 10/1998 |
| KR | 1998-051180 | 10/1998 |
| KR | 10-0181685 B1 | 12/1998 |
| KR | 10-2004-0035009 A | 4/2004 |
| KR | 100766541 | 10/2007 |
| KR | 1020080068390 | 7/2008 |

\* cited by examiner

*Primary Examiner* — Thomas G Black
*Assistant Examiner* — Ana Thomas
(74) *Attorney, Agent, or Firm* — Mintz Levin Cohn Ferris Glovsky and Popeo, P.C.; Peter F. Corless

(57) ABSTRACT

An apparatus that senses a minor collision of a vehicle is configured to minimize damage to the vehicle by actuating a brake system of the vehicle upon sensing a scratch of the vehicle by analyzing a sound (e.g., a sound wave signal) generated when a surface of the vehicle is scratched by, for example, a column of a building, the other vehicle, or the like when the vehicle is driven forward or backward at or below a certain speed.

13 Claims, 4 Drawing Sheets

_US 9,233,667 B2_

APPARATUS OF SENSING MINOR COLLISION OF VEHICLE AND METHOD THEREOF

CROSS-REFERENCE TO RELATED APPLICATION

This application is based on and claims priority from Korean Patent Application No. 10-2013-0065785, filed on Jun. 10, 2013 in the Korean intellectual Property Office, the disclosure of which is incorporated herein in its entirety by reference.

BACKGROUND OF THE INVENTION

1. Field of the Invention

The present invention relates to an apparatus of sensing a minor collision of a vehicle and a method thereof, and more particularly, to a technology for sensing when a vehicle is scratched by analyzing a sound (e.g., a sound wave signal) generated while a surface of the vehicle is scratched by a column of a building, another vehicle, or the like when the vehicle is being driven forward or backward below a certain speed.

2. Description of the Prior Art

In general, when a vehicle is parked in a parking lot in for example an apartment complex or a public parking lot, minor collisions (i.e., scratches or small dents) with other vehicles frequently occur due to how narrow the parking spaces are. Particularly, inexperienced drivers often scratch the vehicle by rubbing the vehicle along a column of a building while parking the vehicle without knowing that they are coming in contact with the column.

Typically, most of drivers do not know at the time of the collision that such a collision has occurred. Instead, it is often some time later before the scratches or dents are found. As a result, the damage to the vehicle is not minimized.

In an effort to solve the above-mentioned problem, some systems have implemented an impact sensing sensor and inform the driver when an impact against the vehicle is sensed. However, these systems described above are effective only when the impact is above a certain threshold value and do not sense minor collisions (i.e., scratches and small dents)

SUMMARY OF THE INVENTION

Accordingly, the present invention has been made to solve the above-mentioned problems occurring in the related art while advantages achieved by the related art are maintained intact.

One subject to be achieved by the present invention is to provide an apparatus that is configured to sense a minor collision of a vehicle and a method thereof that minimizes damage to the vehicle by actuating a brake system within the vehicle upon sensing that the vehicle is being scratched by analyzing a sound (e.g., a sound wave signal) generated when a surface of the vehicle is scratched by, e.g., a column of a building, another vehicle, or the like when the vehicle is being driven forward or backward below a certain speed (e.g., below 5 kph or less).

In one aspect of the present invention, there is provided an apparatus configured to sense a minor collision of a vehicle, including: a reference signal storing unit (e.g., memory) configured to store a reference signal used to judge when a surface of the vehicle is scratched; an information collecting unit (e.g., a network adaptor) configured to collect information of the vehicle through a vehicle communication network; a sound wave sensor configured to convert a sound wave signal generated from the surface of the vehicle into an electrical signal; and a determination unit (e.g., a processor) configured to determine whether or not the minor collision has occurred by comparing the reference signal with the sound wave signal converted into the electrical signal, when the vehicle is moving below a certain speed (e.g., 5 kph or less).

In another aspect of the present invention, there is provided a method of sensing a minor collision of a vehicle, including: converting, by a sound wave sensor, a sound wave signal generated on a surface of the vehicle into an electrical signal; collecting, by an information collecting unit, information of the vehicle through a vehicle communication network; determining, by a judging unit, whether the vehicle at or below a certain speed, based on the collected information; and determining, by the judging unit, whether or not the minor collision has occurred by comparing a reference signal used for determining a scratch of the surface of the vehicle with the sound wave signal converted into the electrical signal, when the vehicle is moving at or below a certain speed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller. The term controller refers to a hardware device that includes a memory, network adaptor and a processor (i.e., judging unit) configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems an that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
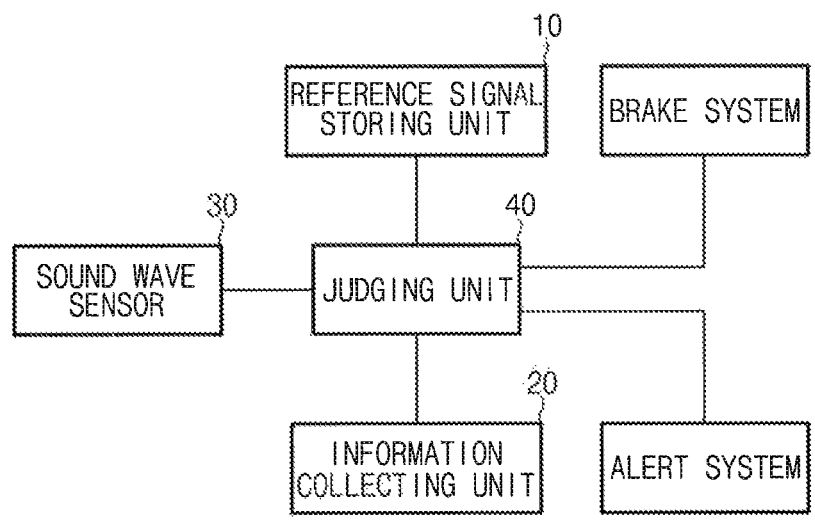
FIG. 1 is a configuration diagram of an apparatus of sensing a minor collision of a vehicle according to an exemplary embodiment of the present invention.

FIG. 1 is a configuration diagram of an apparatus of sensing a minor collision of a vehicle according to an exemplary embodiment of the present invention. As shown in FIG. 1, the apparatus of sensing the minor collision of the vehicle according to the exemplary embodiment of the present invention includes a reference signal storing unit 10, an information collecting unit 20 (e.g., a network adaptor), a sound wave sensor 30, and a judging unit 40 (e.g., a processor).

Figure 3:
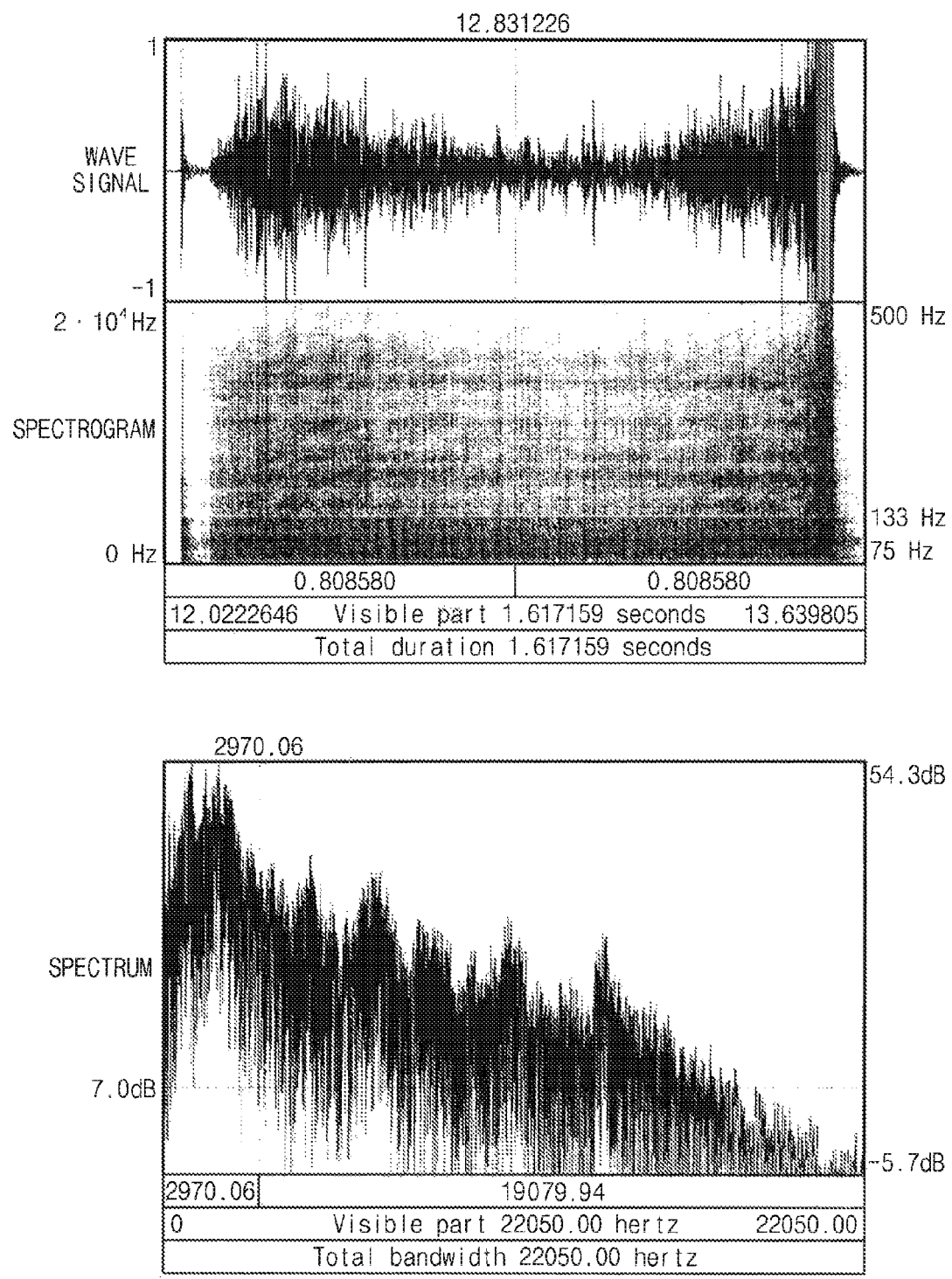
FIG. 3 is an illustration view for a signal (a sound wave signal converted into an electrical signal) generated when a surface of the vehicle is scratched.
Figure 4:
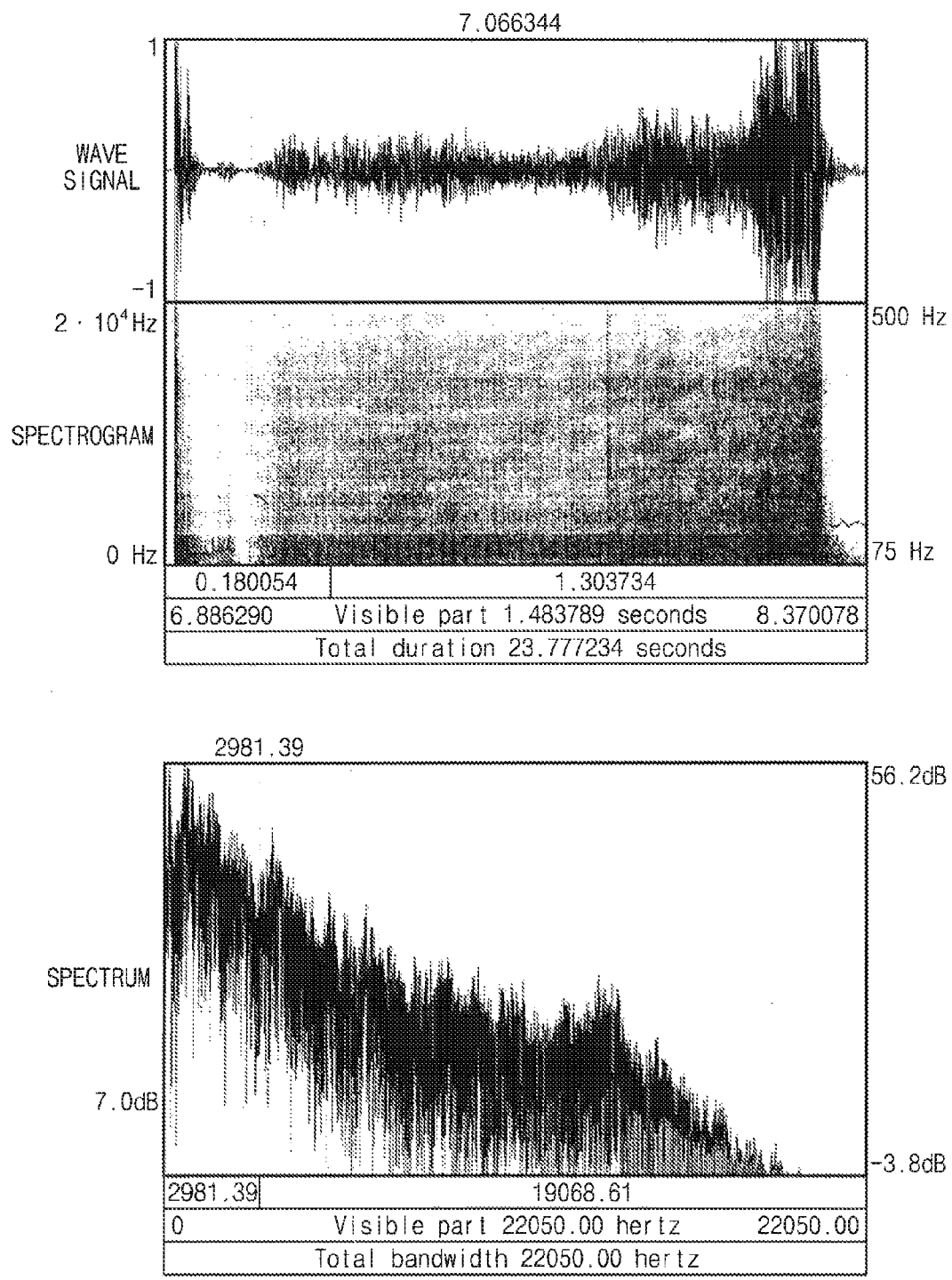
FIG. 4 is another illustration view for a signal (a sound wave signal converted into an electrical signal) generated when a surface of the vehicle is scratched.

Describing each component described above, first, the reference signal storing unit 10 (e.g., a memory) stores a reference signal used for judging a scratch of a surface of the vehicle. In this case, the reference signal is a sound wave signal generated when the surface (metal) of the vehicle is scratched by, for example, another vehicle or a column of a building when a vehicle is moving below a certain speed (as an example, at 5 kph or less), as shown in FIG. 3 or FIG. 4 as an example.

Next, the information collecting unit 20 (e.g., a network adaptor) collects speed and transmits information about the vehicle through a vehicle communication network. In this case, the collected information refers to for example whether the vehicle is in a drive state D or in a reverse state R or in a parking state P. Here, the vehicle communication network includes a controller area network (CAN), a local interconnect network (LIN), a FlexRay, a media oriented system transport (Most), or the like. Furthermore, a sound wave sensor 30, e.g., a microphone, converts the sound wave signal generated from the surface of the vehicle into an electrical signal.

As such, one or more sound wave sensors 30 may be provided, so that the sensors 30 may be used for determining the location of a scratch on the vehicle. That is, the sound wave sensors 30 may each be mounted on, for example, on front left and right sides of the vehicle and on a rear left fender and rear right fender of the vehicle in order to determine where the minor collision has occurred. Of course, the sound wave sensor 30 may be mounted on front and rear bumpers of the vehicle as well without departed from the intent of the present invention.

In particular, the judging unit 40 (e.g., processor) determines whether the sound wave signal converted into the electrical signal by the sound wave sensor 30 is the signal generated when the surface of the vehicle is scratched or dented, based on the reference signal storing unit 10 (e.g., memory) when the vehicle is moving at or below a certain speed (e.g., 5 kph). That is, the judging unit 40 determines whether or not the minor collision has occurred by comparing the sound wave signal converted into the electrical signal by the sound wave sensor 30 with the reference signal stored in the reference signal storing unit 10, when the vehicle is moving at or below a certain speed.

In this case, whether or not the vehicle is moving below a certain speed is based on information collected by the information collecting unit 20. The system is only operated at or below a certain speed because when the system is operated above a certain speed, the wind generates a sound similar to a scratch sound of the surface of the vehicle, even though a minor collision has not occurred.

In addition, when the vehicle gets in an accident at higher speeds, it is easier to identify that an accident has occurred and can be easily identified by a driver and may also be easily sensed by an impact sensing sensor mentioned in the related art and thus higher speed collisions are not relevant to the exemplary embodiment of the present invention.

Meanwhile, the judging unit 40 may determine that the minor collision has occurred when a similarity between the sound wave signal converted into the electrical signal and a reference signal exceeds a threshold value for example. In this case, since a process of detecting a similarity between two signals is a well-known in the art, a detailed description thereof will be omitted.

More specifically, when the judging unit 40 determines that a minor collision has occurred, the judging unit 40 transmits a control signal t to the brake system to apply the brakes on the vehicle and to an alert system to emit a sound to notify the driver of the collision. In this case, the alert system may be replaced with an audio video navigation (AVN) system integrated within the vehicle. As such, the sound wave sensor 30 may further include an analog-to-digital (A/D) converting unit (not shown) that is configured to convert an analog electrical signal into a digital signal.

Figure 2:
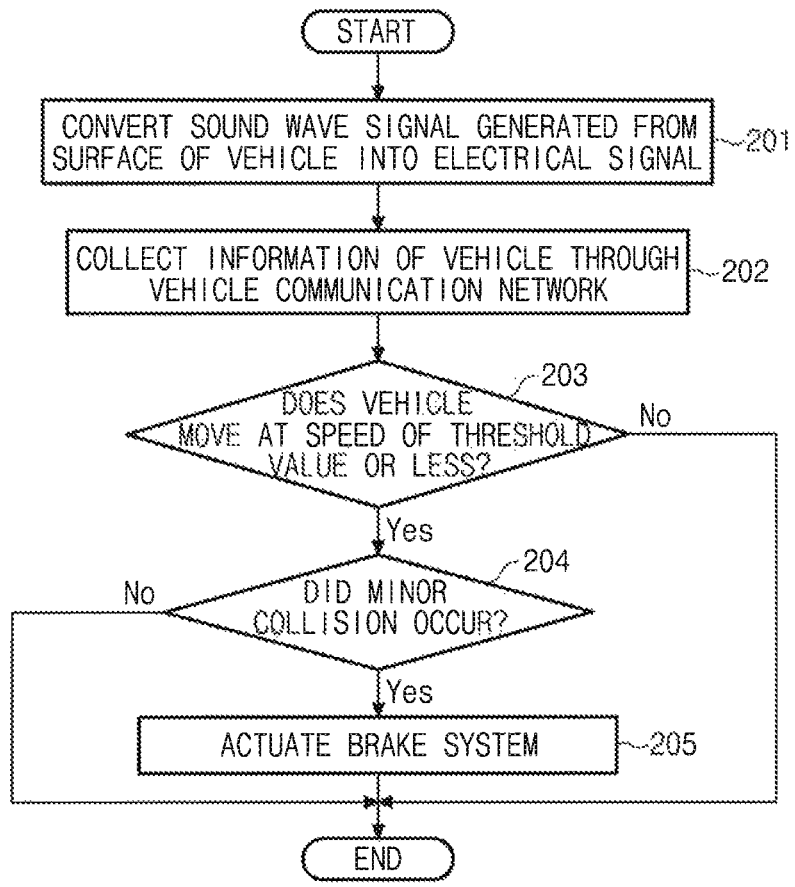
FIG. 2 is a flow chart of a method of sensing a minor collision of a vehicle according to an exemplary embodiment of the present invention.

FIG. 2 is a flow chart of a method of sensing a minor collision of a vehicle according to an exemplary embodiment of the present invention. First, the sound wave sensor 30 converts the sound wave signal generated from the surface of the vehicle into the electrical signal (201). Meanwhile, the information collecting unit 20 collects information about the vehicle through the vehicle communication network (202). The judging unit 40 monitors the speed of the vehicle and determines whether the vehicle is moving below a certain speed based on the information collected by the information collecting unit 20 (203).

As a result of the determination in (203), when the vehicle is not moving at or below a certain speed, the method ends.

However, when the vehicle is moving below the certain speed, the judging unit then determines whether or not the minor collision has occurred by comparing the reference signal used for judging the scratch of the surface of the vehicle with the sound wave signal converted into the electrical signal (204). As a result of the determination (204), when the reference signal and the sound wave signal converted into the electrical signal are not equal (or similar) to each other, it is determined that the minor collision has not occurred and the method ends.

As a result of the determination (204), when the reference signal and the sound wave signal converted into the electrical signal are equal (or similar) to each other, it is determined that the minor collision has occurred and the brake system is actuated (205). Of course, the alert system may be actuated.

In some exemplary embodiments of the present invention, the process of determining whether the minor collision has occurred, as described in the present invention may be periodically performed.

FIG. 3 is an illustration view for a signal (a sound wave signal converted into an electrical signal) generated when a surface of the vehicle is scratched.

FIG. 4 is another illustration view for a signal (e.g., a sound wave signal converted into an electrical signal) generated when a surface of the vehicle is scratched. As set forth above, the present invention may minimize damage to the vehicle by generating an alert sound or actuating a brake system of the vehicle after sensing a scratch of the vehicle by analyzing a sound (a sound wave signal) generated while a surface of the vehicle is scratched by a column of a building, the other vehicle, or the like when the vehicle is driven forward or backward below a certain speed The present invention described above may be variously substituted, altered, and modified by those skilled in the art to which the present invention pertains without departing from the scope and spirit of the present invention. Therefore, the present invention is not limited to the above-mentioned exemplary embodiments and the accompanying drawings.

What is claimed is:

1. An apparatus of sensing a minor collision of a vehicle, comprising:
   a reference signal storing unit configured to store a reference signal used for determining when a scratch on a surface of the vehicle has occurred;
   an information collecting unit configured to collect information about the vehicle through a vehicle communication network;
   a sound wave sensor configured to convert a sound wave signal generated from the surface of the vehicle into an electrical signal; and
   a judging unit configured to determine whether or not the minor collision has occurred by comparing the reference signal with the sound wave signal converted into the electrical signal, when the vehicle is moving at or below a certain speed.

2. The apparatus of sensing a minor collision of a vehicle according to claim 1, wherein the judging unit actuates a brake system of the vehicle, when it is determined that the minor collision has occurred.

3. The apparatus of sensing a minor collision of a vehicle according to claim 1, wherein the judging unit actuates an alert system of the vehicle, when it is determined that the minor collision has occurred.

4. The apparatus of sensing a minor collision of a vehicle according to claim 1, wherein the sound wave sensor is mounted on at least one of front left and right fenders, rear left and right fenders, and front and rear bumpers.

5. The apparatus of sensing a minor collision of a vehicle according to claim 4, wherein the judging unit determines a location in which the minor collision has occurred, based on a location of the sound wave sensor.

6. A method of sensing a minor collision of a vehicle, comprising:
   converting, by a sound wave sensor, a sound wave signal generated from a surface of the vehicle into an electrical signal;
   collecting, by an information collecting unit, information of the vehicle through a vehicle communication network;
   judging, by a judging unit, whether the vehicle moves at a speed of a threshold value or less, based on the information of the vehicle; and
   judging, by the judging unit, whether or not the minor collision has occurred by comparing a reference signal used for judging a scratch of the surface of the vehicle with the sound wave signal converted into the electrical signal, in a state in which the vehicle moves at the speed of the threshold value or less.

7. The method of sensing a minor collision of a vehicle according to claim 6, wherein the judging of whether or not the minor collision has occurred further includes actuating a brake system of the vehicle when it is determined that the minor collision has occurred.

8. The method of sensing a minor collision of a vehicle according to claim 6, wherein the judging of whether or not the minor collision has occurred further includes actuating an alert system of the vehicle when it is determined that the minor collision has occurred.

9. The method of sensing a minor collision of a vehicle according to claim 6, wherein the judging of whether or not the minor collision has occurred further includes judging a location at which the minor collision has occurred, based on a location of the sound wave sensor in the vehicle.

10. A non-transitory computer readable medium containing program instructions executed by a processor or controller, the computer readable medium comprising:
    program instructions that determine whether a vehicle is moving at or below a certain speeds, based on information collected about the vehicle; and
    program instructions that determine whether or not a minor collision has occurred by comparing a reference signal used for identifying a scratch on a surface of the vehicle with a sound wave signal converted into an electrical signal, when the vehicle is moving at or below a certain speed.

11. The non-transitory computer readable medium according to claim 10, wherein the program instructions that determine whether or not the minor collision has occurred further includes actuating a brake system of the vehicle upon determining that the minor collision has occurred.

12. The non-transitory computer readable medium according to claim 10 wherein the program instructions that determine whether or not the minor collision has occurred further includes actuating an alert system of the vehicle upon determining that the minor collision has occurred.

13. The non-transitory computer readable medium according to claim 10 wherein the program instructions that determine whether or not the minor collision has occurred further includes program instructions that determine a location at which the minor collision has occurred, based on a location of the sound wave sensor in the vehicle.

* * * * *